July 29, 1958   H. S. FOWLER ET AL   2,844,936
CONTROL OF REHEAT IN TURBOJET ENGINES
Filed July 15, 1955   3 Sheets-Sheet 3

United States Patent Office 2,844,936
Patented July 29, 1958

2,844,936

CONTROL OF REHEAT IN TURBOJET ENGINES

Howard S. Fowler, Ottawa, Ontario, and Douglas A. J. Millar, Cyrville, Ontario, Canada, assignors to National Research Council, Ottawa, Canada, a body corporate of Canada Application July 15, 1955, Serial No. 522,259

1 Claim. (Cl. 60—35.6)

This invention relates to improvements in the control of reheat in turbojet engines, and is concerned more especially with engines of the type employing a variable-area nozzle.

The object of the invention is the provision of a system for controlling the quantity of fuel supplied to the reheat combustion system of a turbojet engine, and also the extent of the opening of the variable-area nozzle of the engine, so that the whole engine always operates efficiently whatever amount of reheated thrust the pilot selects. It is required for efficient operation that the gas shall pass through the nozzle at the rear end of the jetpipe at the local speed of sound. For each setting of the variable-area nozzle there will be a different quantity of gas flow and thus a different quantity of reheat fuel required to provide this sonic gas velocity.

Attempts have been made in the past to control the variable-area nozzle and the reheat fuel throttle in a co-ordinated manner, but difficulties have been encountered. The co-ordination requires to be very close, and the response rates demanded of the apparatus are high, if the possibility of unstable operation is to be avoided. It will be appreciated that too much reheat fuel for a given nozzle area can in a very short time cause excessive temperatures in the jetpipe. Efforts have been made to control the reheat fuel throttle in accordance with temperature conditions in the jetpipe and thus indirectly to obtain a regulation of the reheat fuel that is a function of the nozzle opening. The main disadvantage of such a system is that the response rate of the system is too slow, and there is often a tendency to hunt.

In accordance with the present invention, a more quick acting and stable system is produced by the provision of means for determining the actual instantaneous area of opening of said nozzle, such means being connected to means for regulating the setting of the reheat fuel throttle so as automatically to vary the quantity of reheat fuel admitted by said throttle on variation of said nozzle opening area whereby to maintain the velocity of the gases passing through said nozzle at the velocity of sound.

Although in practice a system operating in this manner may, and usually will, employ electrical elements and connections, reliance is not so likely to have to be placed on the less reliable type of electrical elements (such as thermionic components) in a system operating in accordance with the invention, than in a system of the type envisaged above in which the reheat fuel throttle is controlled solely by the signal received from a thermometer or other thermometric device. A merit of the present invention thus lies in the more robust character of the operating parts.

In addition to the main coarse reheat fuel control provided in a system operating according to the present invention, it is normally necessary to furnish a fine control which is sensitive to some operationally significant engine parameter such as the turbine inlet temperature, turbine outlet temperature or the ratio of the absolute compressor exit pressure and the absolute turbine exit pressure. The ambient air pressure or altitude may also be a factor taken into consideration in determining the setting of the trim, or fine control, reheat throttle.

A system of control for reheat constructed in accordance with the invention is illustrated diagrammatically in the accompanying drawings in which.

Figure 1:
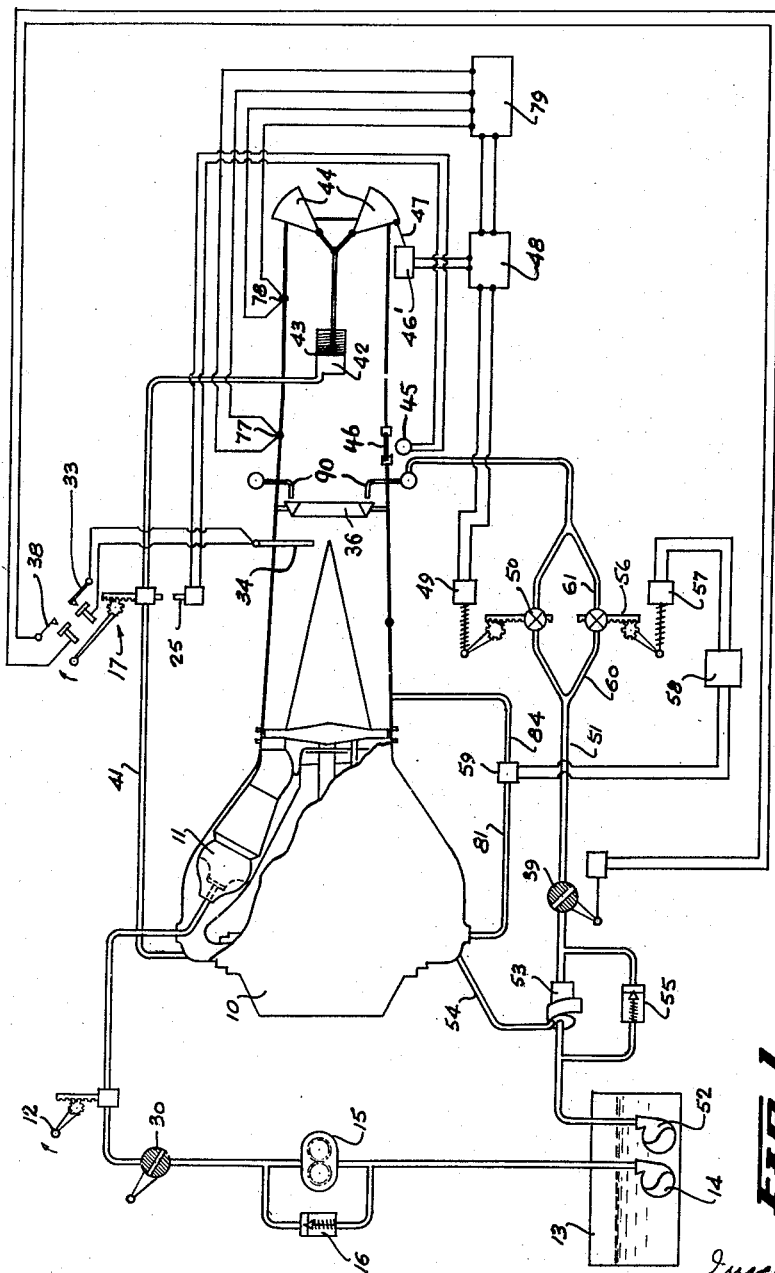
Figure 1 shows schematically the overall system of an engine operating according to the invention.

Referring initially to Figure 1, the main portion of the engine is illustrated generally at 10. Conventional details have not been illustrated, but one combustion chamber 11 is shown to illustrate the relative positions of the combustion chambers and the other parts of the apparatus now to be described. In Figure 1 the main fuel supply to the combustion chambers 11 is shown as passing through a shut-off cock 30 and a throttle 12 from a fuel tank 13, this fuel being impelled firstly by a pump 14 in the tank 13 and secondly by a high pressure pump 15, in the usual way, with a release by-pass 16 arranged across the high pressure pump 15.

For simplicity of illustration the overall schematic diagram of Figure 1 shows a separate reheat throttle control 17. In fact, the engine throttle 12 and the reheat throttle control 17 are not truly separate devices, both forming parts of the same device which is illustrated in more detail in Figure 2 where it is designated by the reference numeral 18. As may be seen by consideration of Figure 2, this combined engine and reheat throttle control mechanism 18 (referred to simply as a "throttle control" below for convenience) comprises a quadrant 19 of operating cams and a control lever 20 connected thereto by a spring 21. Means are provided for locking the quadrant 19 of the throttle control 18, if the engine or reheat igniters are inoperative, so that the quadrant 19 does not necessarily always follow the movement of the control lever 20. As this lever 20 is moved anti-clockwise i. e. towards the open position, it stresses the spring 21 which in turn tends to rotate the quadrant 19 in an anti-clockwise direction. Should the quadrant 19 be locked, however, it will remain unmoved, while as soon as it is released, it will take up a position determined by the setting of the control lever 20. The first locking device incorporated in the quadrant 19 is a recess 22 which co-operates with an electro-magnetically operated movable bolt 23, and the second locking device on the quadrant 19 is a recess 24 that co-operates with an electro-magnetically operated bolt 25.

Figure 2:
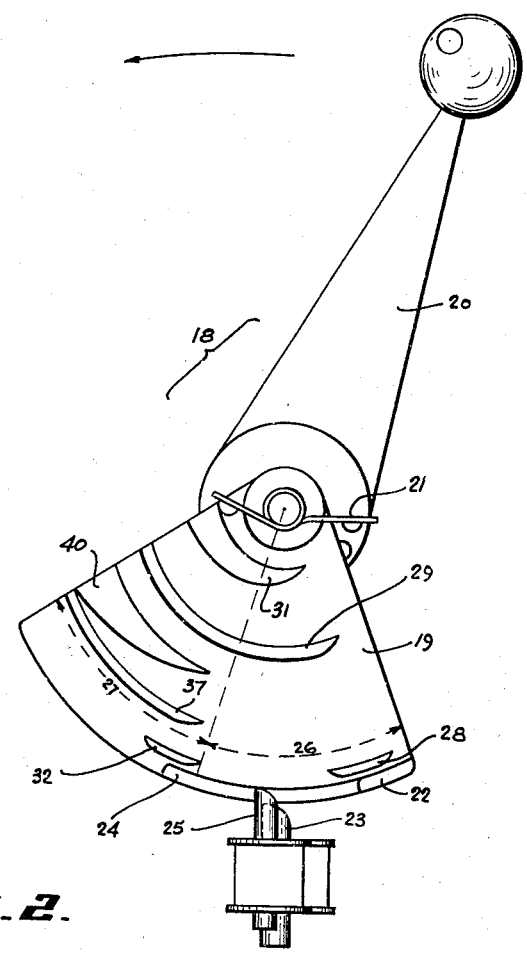
Figure 2 is a diagrammatic representation of a throttle control mechanism for use with this engine.

The quadrant 19 is divided into two parts, namely the unreheat region 26 and the reheat region 27. In the unreheat region 26 there are provided three cams that control the operation of the engine during its unreheated operation and operate closely one after the other. The first such cam is an engine igniter cam 28 that co-operates with a cam follower (not shown) that controls the supply of power to the engine igniter (not shown). This is the cam first to operate on movement of the quadrant 19 in the anti-clockwise direction. The second cam to operate in the unreheat region 26 of the quadrant 19 is an engine shut-off cock cam 29, the follower (not shown) of this cam 29 being operative to open the engine shut-off cock 30. The next cam to operate as the quadrant 19 rotates anti-clockwise is an engine throttle cam 31 which provides gradual increase in the opening of the throttle 12 as the quadrant rotates further in the anti-clockwise direction. There will normally be a small permanent leak through the engine throttle 12 to allow some fuel to pass to the engine as soon as the shut-off cock 30 is opened. These parts controlling the engine during unreheated operation are not shown in detail in Figure 1, since they are conventional. Should the engine igniter not operate satisfactorily to initiate ignition of the engine, the bolt 23 will not be retracted and it will thus prevent further movement of the quadrant 19 and opening of the throttle 12 until the fault has been corrected. The throttle control 18 is shown in Figure 2 in a position intermediate between the extreme ends of the unreheat region 26 of operation of the engine.

When the pilot wishes to employ reheat in the engine, he moves the control lever 20 across a conventional gate that enables such lever to rotate further in the anti-clockwise direction and for the reheat region 27 of the quadrant 19 to be effective on the various cam followers controlled thereby. The first cam to operate in the reheat region 27 is a reheat igniter cam 32. This cam 32 operates a microswitch 33 (see Figure 1) which feeds power to a reheat igniter 34 situated in the jetpipe 35 of the engine at a suitable point adjacent the flameholder 36 therein. A short time later a reheat shut-off cock cam 37 is effective to operate a further micro-switch 38 which completes a circuit controlling a reheat fuel shut-off cock 39, opening such cock. Then a reheat throttle cam 40 begins to move its cam follower (not shown) to control the reheat throttle control 17 which is arranged in a conduit 41 along which pressure air can flow from the compressor in the engine 10 to a cylinder 42 in which is situated a piston 43 controlling the movement of a variable-area nozzle 44 of a type settable to any one of an infinite number of positions intermediate between the extreme positions, said nozzle being arranged at the rear end of the jetpipe 35. The reheat throttle control 17 does not therefore directly control the reheat fuel supplied to the engine. It acts solely on the control mechanism of the variable-area nozzle 44. As will become apparent from the later description, movement of this nozzle 44 controls the supply of reheat fuel to the engine.

Should the igniter 34 not be effective to ignite the reheat fuel, the bolt 25 will not be retracted from the recess 24 and any further movement of the quadrant 19 will be prevented, even though the control lever 20 may be moved to the full open throttle position. As soon as correct ignition of the reheat fuel takes place, however, such bolt will be withdrawn and the quadrant 19 will be free to turn and take up a position corresponding to that set by the control lever 20. These parts are illustrated diagrammatically in Figure 1 where the bolt 25 is shown as electrically operated by a photo-electric ignition detector 45 situated outside a quartz window 46 in the jetpipe 35.

The movement of the variable-area nozzle 44 is determined by a nozzle position sensor 46' connected to a part of such nozzle 44 by a connecting link 47. The signal from this nozzle position sensor 46 is in electrical form and is transmitted to an amplifier 48, the output of which passes to a servo-mechanism 49 controlling a main reheat throttle 50. This main reheat throttle 50 is situated in the reheat fuel supply pipe 51 which extends from a pump 52 in the tank 13; through a high pressure pump 53 which is driven by air passing down a conduit 54 from the compressor of the engine, and which is by-passed by a relief valve 55; through the reheat fuel shut-off cock 39; to discharge orifices 90 arranged in the neighbourhood of the flameholder 36 and, if desired, to other discharge orifices (not shown) situated further upstream in the engine.

Thus it will be seen that with the system provided by the invention, the main supply of reheat fuel is directly determined by the position of the variable-area nozzle, that is to say by the actual area of such nozzle at any given moment. It follows that, theoretically, exactly the correct amount of fuel for the given nozzle area to provide optimum operation with the gases travelling just below the speed of sound should be provided by this system and that there should be no tendency for the reheat fuel supply control mechanism to supply either more reheat fuel than is safe for any given nozzle area or less fuel than is required for optimum operation. Thus the pilot, on requiring reheat, exerts a direct control on the area of the nozzle, which latter, in turn exerts direct control on the reheat fuel supply. This avoids any undesirable effects inherent in systems where the pilot's control lever simultaneously exerts a direct control on the nozzle opening and the reheat fuel fed to the engine, as a result of differences between the operating time lags of the nozzle actuating and the fuel supply systems. Moreover, it provides automatically for failure of the nozzle operating mechanism. If the nozzle does not increase in area, as required to accommodate the greater quantity of gases that will flow through the jetpipe 35 when operating with reheat, no reheat fuel will be fed into the engine.

In practice, it is not wholly sufficient to rely on the variable-area nozzle 44 for determining the exact quantity of reheat fuel supplied to the engine. In addition to the main reheat throttle 50 there is provided a trim reheat throttle 56 operated by a coil 57. In the engine illustrated the main and trim reheat throttles 50 and 56 are arranged in parallel. This arrangement will require the trim reheat throttle 56 to be able to accommodate only about a quarter, or at the most a third, of the throughput handled by the main reheat throttle 50. It can therefore be made to respond rapidly to incoming control signals. On the other hand, the different pressure drops across the two throttles will require to be taken into account. If this proves a difficult problem, the two reheat throttles may be arranged in series.

Both the main and trim reheat throttles may be of conventional design. A particularly suitable form of servo-mechanism for this purpose and having a high response rate has been illustrated in Figure 3. This mechanism will be described in the capacity of trim throttle 56, but a similar mechanism may be used for the main throttle 50, this form of construction being especially suited to use as a trim throttle by reason of its high response rate.

Figure 3:
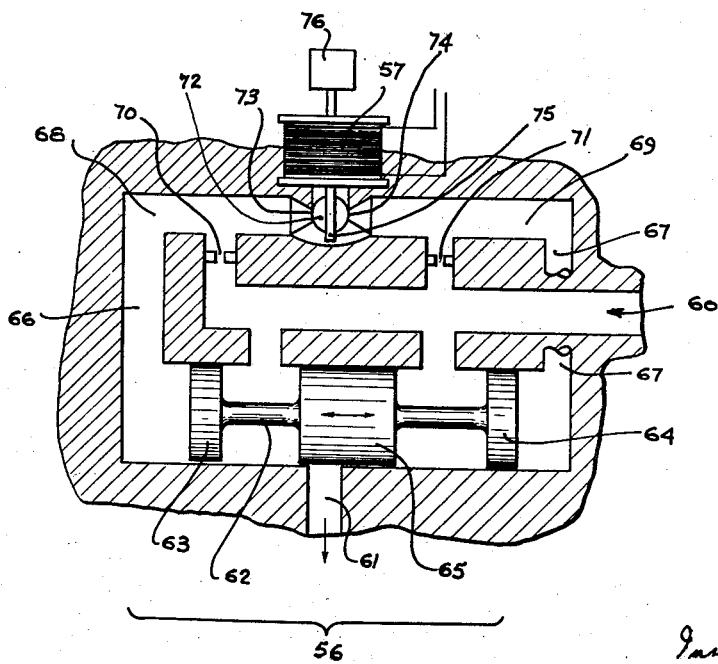
Figure 3 is a diagram illustrating one form of reheat throttle valve.

Figure 3 shows a fuel inlet pipe 60 and a fuel outlet pipe 61. Between these two pipes there is positioned a valve in the form of a stem 62 provided with a central valve member 65 and piston heads 63 and 64 one at each end of such stem. The fuel inlet pipe 60 communicates with each side of the valve member 65 to equalize the pressure thereon and thus leave the determination of the position of the stem 62 entirely dependent on the differential pressures exerted on the piston heads 63 and 64. The faces of these piston heads directed towards the valve member are also both subjected to the incoming fuel pressure, so it will be the pressures on their outer faces that will control the position of the stem 62. These outer faces of the piston heads 63 and 64 are exposed through passages 66 and 67 to the pressures in chambers 68 and 69 respectively. These chambers 68 and 69 are each supplied with fuel from the fuel inlet pipe 60 through a small orifice 70 or 71. In addition, the chambers 68 and 69 can both lose fuel to a drain pipe 72 through nozzles 73 and 74 respectively. The passage of fuel to the drain pipe 72 is determined by means of a flap valve 75 which is movable towards or away from each nozzle 73, 74 (away from one nozzle when towards the other) by means of the coil 57 (see also Figure 1), the movement being damped by a dash pot 76. On receipt of the appropriate signal at the coil 57 requiring say a greater throughput of fuel, the valve 75 will be moved to the left to restrict flow through the nozzle 73 to the drain pipe 72. Pressure will thus build up in the chamber 68 comparable with that in the inlet pipe 60, while the flow through the nozzle 74 to the drain pipe 72 will exceed the restricted flow through the orifice 71 until the pressure in the chamber 69 quickly falls to that of the drain pipe 72. There will thus suddenly appear a high differential pressure in the chambers 68, 69, which, communicated to the outer faces of the piston heads 63, 64, will cause rapid movement of the stem 62 to the right with consequent uncovering of the outlet pipe 61 by the valve member 65. When less fuel is required to be supplied by the trim throttle 56, the reverse action will take place.

Figure 4:
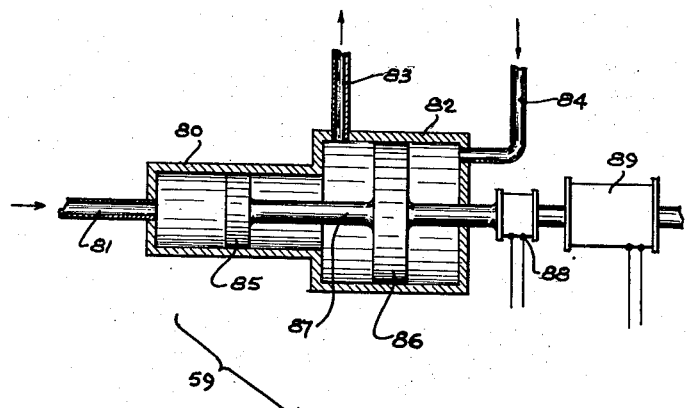
Figure 4 shows a form of pressure-ratio control box that may be used with this engine.

The coil 57 of the trim throttle 56 is itself controlled through an amplifier 58 from a pressure-ratio control box 59 (Figure 1). One form that such box 59 may take is illustrated diagrammatically in Figure 4. It consists of a first cylinder 80 connected to a pipe 81 leading to a part of the engine adjacent the compressor exit so that the pressure in this pipe 81 is the compressor exit pressure. A second cylinder 82 forming an enlarged extension of the cylinder 80 is provided with a vent 83 connected to atmosphere and a pipe 84 connected to a point in the engine adjacent the turbine exit. The pressure in the pipe 84 is thus equal to the turbine exit pressure. The box 59 also includes a pair of pistons 85 and 86 movable respectively in the cylinders 80 and 82 and rigidly connected together by a spindle 87 which extends outwardly of the box 59 to pass through a dither coil 88 and into a position-transmitting coil 89. The compressor exit pressure communicated by the pipe 81 is applied to one side of the piston 85 and the turbine exit pressure communicated through the pipe 84 is applied to the remote side of the other piston 86, the space between the pistons being in communication with the atmospheric vent 83. The areas of the two pistons 85 and 86 are different from one another in proportion to the desired ratio between the absolute compressor exit pressure and the absolute turbine exit pressure, so that the spindle 87 will remain in a central position so long as such ratio is maintained. Should, however, the ratio of the turbine and compressor exit pressures rise unduly, due to an excessive back pressure in the engine resulting from an excess of reheat fuel for a given nozzle opening, the spindle 87 will move to the left and such movement will be detected by the position-transmitting coil 89 and transmitted through the amplifier 58 to the trim throttle motor 57 in the form of a signal operative to reduce the total quantity of reheat fuel supplied to the engine. Conversely, if the ratio falls, the spindle will be moved to the right to increase the flow of fuel through the trim reheat throttle. The operation of the dither coil is conventional, being to vibrate the spindle 87 and prevent sticking friction between the parts.

It is, of course, not possible for the operation of these devices to shut down the reheat entirely, against the pilot's desire, since they operate only on the fine control of fuel, while the coarse control is scheduled by the nozzle opening. This gives the pilot sufficient controllable capacity to keep the reheat system operating, although at reduced turbine exit temperature.

It is also normally essential to provide modulation of the reheat fuel with altitude, apart from the above-mentioned secondary effect. This can be conveniently carried out in a conventional manner (not shown).

Two safety devices are incorporated in the jetpipe 35. These again are conventional in construction and disposition and are accordingly illustrated diagrammatically. The first such device is a thermocouple 77 which determines the temperature of the exhaust gases in the jetpipe 35, and the second device is a series of thermocouples (illustrated as a single item 78) distributed throughout the inner skin of the metal of the jet pipe 35 to detect any unduly high values of temperature in the metal. Both the devices 77 and 78 act on a discriminator 79 which in turn is connected to the amplifier 48. If unsafe values are detected by either of the devices 77 or 78, the discriminator 79 will act on the amplifier 48 to energize the coil 49 to reduce the flow of fuel through the main throttle 50.

We claim:

In a turbojet engine of the type having a main combustion stage and a reheat combustion stage, a jetpipe, a variable-area propulsion nozzle at the rear end of said jetpipe, means for controlling the area of said nozzle, reheat fuel supply means including a main reheat fuel throttle arranged to exert a coarse control on the quantity of reheat fuel admitted to the engine and a trim reheat fuel throttle arranged to exert a fine control on the quantity of reheat fuel admitted to the engine, means for regulating the setting of said main throttle, means for regulating the setting of said trim throttle, means for determining the actual instantaneous area of opening of said nozzle, and means for determining the ratio of the absolute compressor exit pressure and the absolute turbine exit pressure, said nozzle opening area determining means being connected to said means regulating the setting of said main throttle so as automatically to vary the quantity of reheat fuel admitted by said main throttle on variation of said nozzle opening area by an amount theoretically necessary to maintain the velocity of the gases passing through said nozzle at a substantially constant predetermined value, and said pressure ratio determining means being connected to said means regulating the setting of said trim throttle so as automatically to vary the passage of reheat fuel therethrough on variation of said ratio in a manner to maintain said ratio at a substantially constant predetermined value.

References Cited in the file of this patent
UNITED STATES PATENTS

| | | |
|---|---|---|
| 2,652,813 | Rueter et al. | Sept. 22, 1953 |
| 2,683,349 | Lawrence | July 13, 1954 |
| 2,706,383 | Jacobson | Apr. 19, 1955 |
| 2,713,767 | Alford et al. | July 26, 1955 |
| 2,737,016 | Day | Mar. 6, 1956 |